(12) United States Patent
Schwarz et al.

(10) Patent No.: US 7,634,539 B2
(45) Date of Patent: Dec. 15, 2009

(54) RELATIONS BETWEEN COLLABORATION WORKSPACES

(75) Inventors: Marcus R. Schwarz, Lampertheim (DE); Stefan Mueller, Sinsheim (DE)

(73) Assignee: SAP AG, Walldorf (DE)

( * ) Notice: Subject to any disclaimer, the term of this patent is extended or adjusted under 35 U.S.C. 154(b) by 737 days.

(21) Appl. No.: 10/990,932

(22) Filed: Nov. 16, 2004

(65) Prior Publication Data

US 2006/0026235 A1 Feb. 2, 2006

Related U.S. Application Data

(60) Provisional application No. 60/598,375, filed on Aug. 2, 2004.

(51) Int. Cl.
*G06F 15/16* (2006.01)
(52) U.S. Cl. .................. 709/204; 709/230; 709/236; 709/249; 709/250
(58) Field of Classification Search ............... 709/204, 709/230, 236, 249, 250
See application file for complete search history.

(56) References Cited

U.S. PATENT DOCUMENTS

| | | | | |
|---|---|---|---|---|
| 6,078,948 A | * | 6/2000 | Podgorny et al. | 709/204 |
| 6,223,177 B1 | * | 4/2001 | Tatham et al. | 709/225 |
| 6,546,393 B1 | * | 4/2003 | Khan | 709/203 |
| 7,028,262 B2 | * | 4/2006 | Estrada et al. | 709/204 |
| 7,069,242 B1 | * | 6/2006 | Sheth et al. | 705/37 |
| 7,072,940 B1 | * | 7/2006 | Day et al. | 709/204 |
| 7,289,980 B2 | * | 10/2007 | Kogut-O'Connell et al. | 709/225 |
| 7,290,061 B2 | * | 10/2007 | Lentini et al. | 709/246 |
| 7,433,921 B2 | * | 10/2008 | Ludwig et al. | 709/204 |
| 2003/0088639 A1 | * | 5/2003 | Lentini et al. | 709/217 |
| 2004/0107249 A1 | * | 6/2004 | Moser et al. | 709/204 |
| 2004/0128354 A1 | * | 7/2004 | Horikiri et al. | 709/204 |
| 2005/0033807 A1 | * | 2/2005 | Lowrance et al. | 709/204 |
| 2005/0138566 A1 | * | 6/2005 | Muller et al. | 709/204 |
| 2005/0144228 A1 | * | 6/2005 | Rokosz et al. | 709/204 |
| 2005/0289234 A1 | * | 12/2005 | Dai et al. | 709/229 |

* cited by examiner

*Primary Examiner*—Phuoc Nguyen
(74) *Attorney, Agent, or Firm*—Mintz, Levin, Cohn, Ferris, Glovsky and Popeo, P.C.

(57) ABSTRACT

A collaborative system includes information about an organization. The organization can be a group of users or a collection of groups. Each user in the organization has access to at least one workspace, a graphical portal to the organization's information. Each workspace displays at least a subset of the information. A relation is defined for selected pairs of workspaces based on workspace type, user access controls, personal preferences, or any number of other factors. The relation enables navigation from one workspace to another workspace in the pair, automatic document transfer from one workspace to another, analysis and reporting on the organization, and other collaborative functions.

20 Claims, 5 Drawing Sheets

Room Relations Manager

You can add new relations to the room or remove existing ones

[Relate Rooms]

| Relation Type | All ▾ |

[Remove Relation]

|   | Relation Type | Room Name | Room Description |
|---|---|---|---|
| ☐ | Info Site | Hot Topics | Place to discuss hot issues |
| ☐ | Project | My Test Room | Test It |

Room Relations Manager

You can filter the available rooms. Specify the appropriate relation type, select the rooms to be related, and add the new relations.

| Room Name | [          ] | Room Directory | My Rooms ▾ |
| Room Category | All ▾ | Room Template | All ▾ |

[Filter]

|   | Room Name | Room Description |
|---|---|---|
| ☐ | Daily Sync Meeting | Meeting to discuss daily topics |
| ☐ | Hot Topics | Place to discuss hot issues |
| ☐ | KMC Overview | Overview about developments in the KMC area. |
| ☐ | KMC Project Eagle | Eagle project room |
| ☐ | KMC Team "Rooms" | Room for the KMC team "Rooms" |
| ☐ | My Test Room | Test It |
| ☐ | Private discussions | private room |

Relation Type [Info Site ▾]   [Add Relation]   [Cancel]

RELATIONS BETWEEN COLLABORATION WORKSPACES

CROSS-REFERENCE TO RELATED APPLICATION

This application claims the benefit of U.S. Provisional Patent Application Ser. No. 60/598,375, filed on Aug. 2, 2004, the contents of which are incorporated by reference into this document.

BACKGROUND

A collaboration workspace (or simply "workspace") includes a network-based portal environment that integrates a number of collaboration tools (i.e. discussion, calendar & mail integration, instant messaging) with other functional components (i.e. document management, project management) to improve collaboration among users. A collaboration workspace maintains associated users, i.e. "members" of the workspace, and the permitted access of those users. For instance, some members will only have access to a limited portion of a number of integrated collaboration tools.

A workspace brings several elements together into one homogenous context: users; collaboration tools and components (i.e. components offering business functionalities provided by some applications); and access permissions of the users to the tools and components and their related content. Templates can be defined for creating workspaces. The templates contain most of the technical details, which can be used by end users to easily create a workspace. Templates can be used both for the creation of workspaces as well as one or more of a workspace's components.

In any given organization, many collaboration workspaces can be created for different purposes. For instance, a workspace can represent an organizational group, a project, an entire department, or just a specific work area of the organization. In general, those workspaces are decoupled, e.g. they can exist without the knowledge of other workspaces.

SUMMARY

In a collaboration system, a relation is defined for selected pairs of workspaces based on workspace type, user access controls, personal preferences, or any number of other factors. The relation couples pairs of workspaces to enable navigation from one workspace to another workspace in the pair, automatic document transfer from one workspace to another, analysis and reporting on the users of the system, and other collaborative functions.

In accordance with an embodiment, each relation of a workspace is graphically rendered in the workspace, allowing immediate linking to other workspaces via a relation. Each relation can include a defined set of rules for routing documents or user navigation requests. Accordingly, a network of relations can be used to couple all of the workspaces in a collaborative system in order to connect workspaces related by content, context, or other means.

BRIEF DESCRIPTION OF THE DRAWINGS

These and other aspects will now be described in detail with reference to the following drawings.

FIGS. 4A and 4B illustrate user interface portal environments employing relations.

DETAILED DESCRIPTION

The systems and techniques described here relate to relations among collaborative workspaces.

Figure 1A:
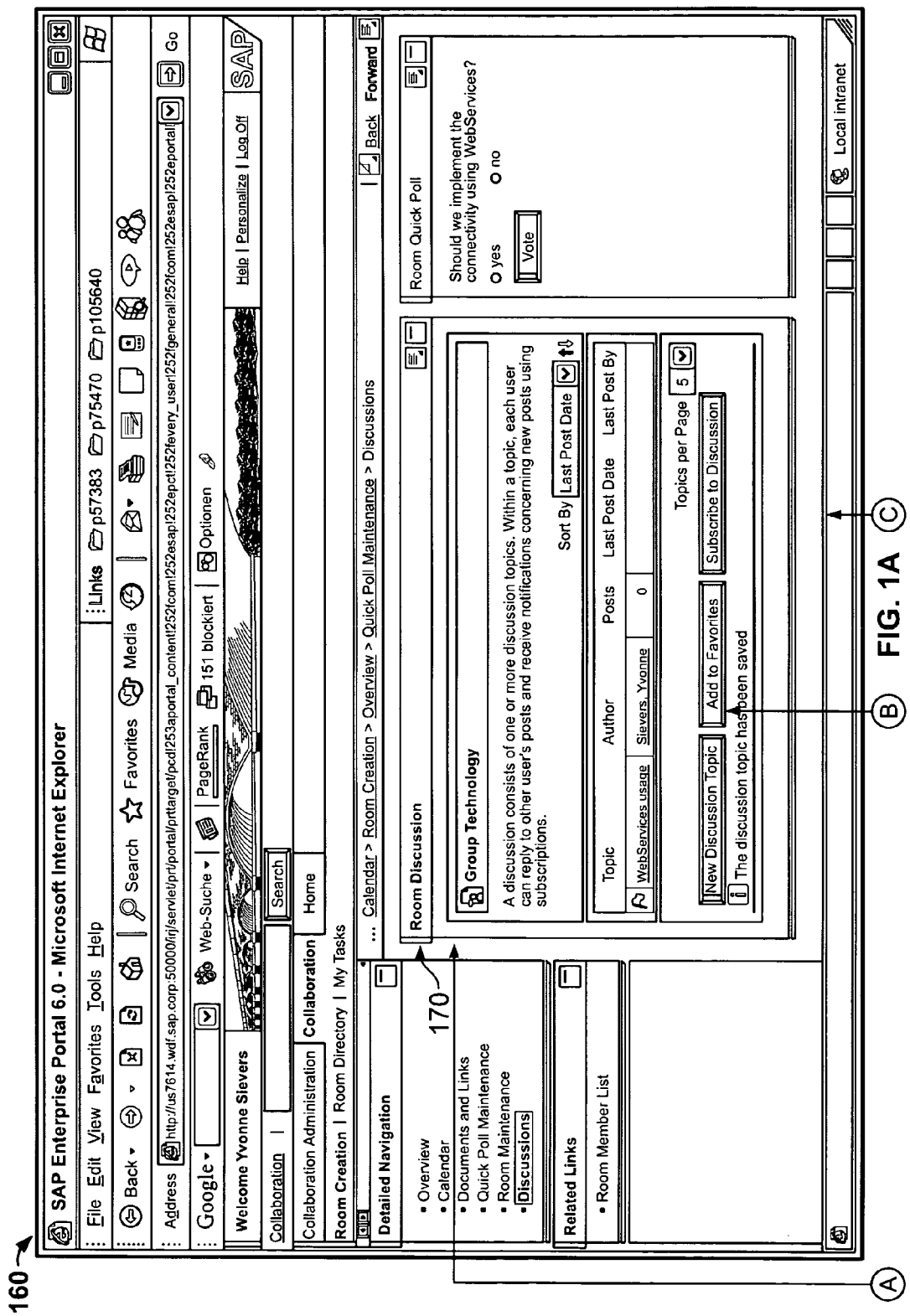
FIG. 1 illustrates a collaboration workspace.
Figure 1B:
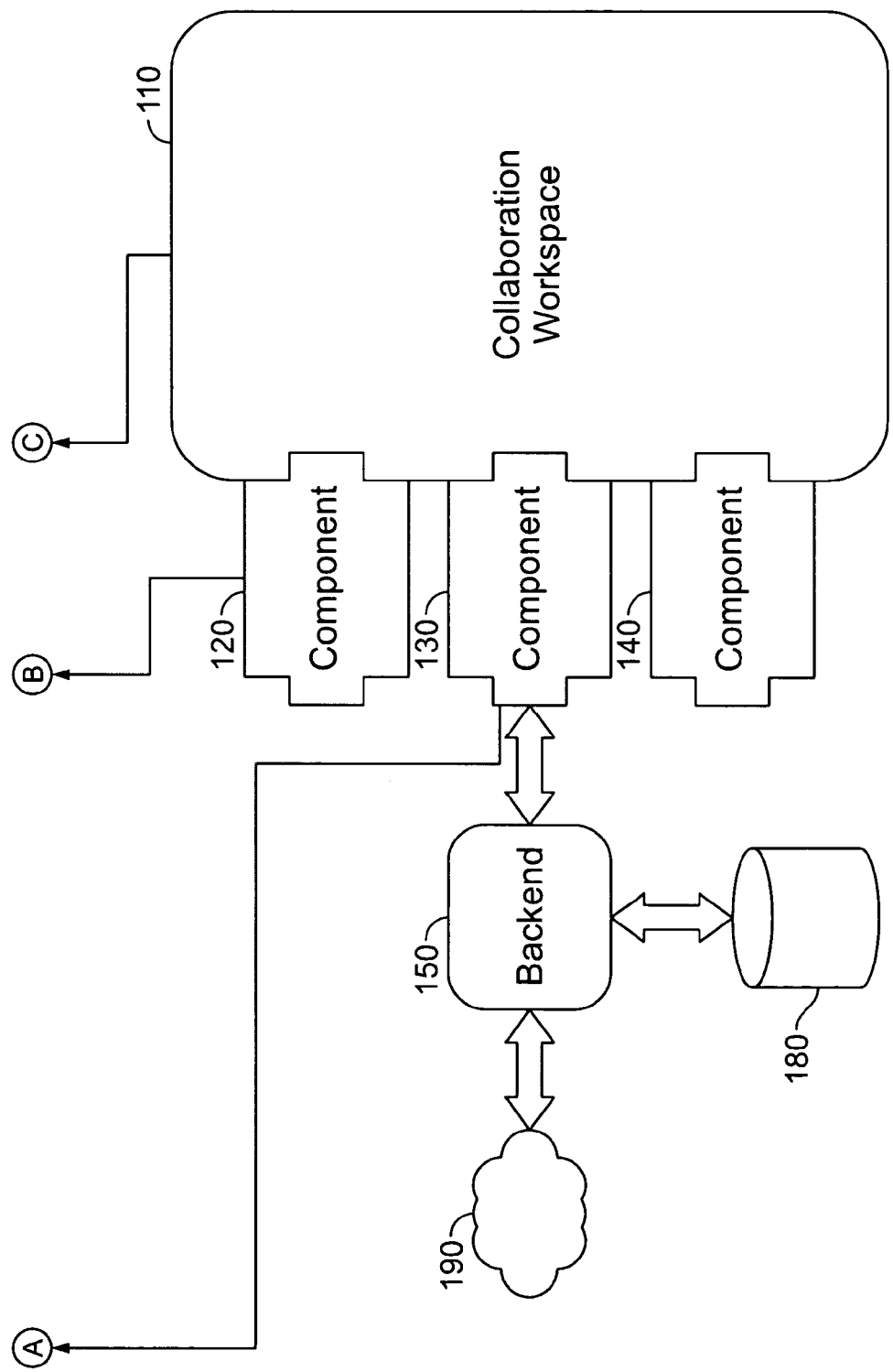

FIG. 1 illustrates a collaboration workspace 110, such as described in U.S. patent application Ser. No. 10/882,496, entitled "Reusable Component in a Collaboration Workspace," the contents of which are incorporated herein for all purposes. Collaboration workspace 110 is integrated with workspace components 120, 130, and 140, of which at least one workspace component (130) can access backend 150. The collaboration workspace 110 may include any combination of tools and resources and/or access to tools and resources. For example, the collaboration workspace 110 may be presented in a graphical user interface and may include a calendar tool and a portal view for accessing a network-meeting tool.

Access to tools and/or resources may be in the form of interactive portal views, also known as "portlets" or "iViews," which present information in any combination of formats for interaction by a user. The format may include text, figures, graphs, reports, tables, or charts. User interface 160 illustrates how the collaboration workspace 110, including the workspace components 120, 130, and 140, might appear to a user. The collaboration workspace 110 includes a discussion area that includes a discussion tool 170 for collaborative discussion among two or more users. The discussion tool 170 is defined by the workspace component 130, which has access to a persistence area 180 and a network 190 through the backend 150. The discussion tool 170 can use the persistence area 180 to store discussion threads.

The component 120 defines an "Add to favorites" feature that is added to the discussion tool 170 by virtue of the component 120. Thus, for example, if the component 120 were removed from the collaboration workspace 110, the "Add to favorites" feature would cease to be part of the discussion tool 170. The component 140 defines access privileges to the discussion tool 170. The component 140 defines that users associated with an administrator role can edit and modify messages posted in the discussion tool 170.

Each of the workspace components that are integrated with the collaboration workspace 110 includes a specification that defines a modification to the collaboration workspace 110. Modifications may include an additional collaboration tool, an additional resource, an additional portal view, or a modification to one or more collaboration tools, resources and/or portal views that are part of a collaboration workspace 110. In addition to modifying a collaboration workspace 110 such that new content is introduced, a workspace component may modify a collaboration workspace by effectively removing content from the collaboration workspace.

Each collaboration workspace 110 component includes parameters that describe aspects of a workspace component and define how a workspace component is used, handled or presented in a collaboration workspace 110. Parameters include the name of a workspace component, a description of the workspace component, or an identifier of the collaboration workspace 110 with which the workspace component is associated. Other parameters may be used, for instance, parameters may include backend system event handlers (which define behaviors that should be performed in conjunction with a backend system upon the occurrence of an event related to a collaboration workspace 110), mappings (which associate properties and/or values of a collaboration workspace with properties and/or values of a workspace component), and access control limitations (which restrict the ability of a user to access workspace tools and/or resources). Parameters can be used for integrating the workspace component with a collaboration workspace. In a role-based collaborative environment, roles of an organization can be assigned to various users. Roles may be automatically mapped from a collaboration workspace to a workspace component and/or vice versa.

The backend 150 is accessible through the workspace component 130. To provide information flow between the backend 150 and the workspace component 130, the workspace component 130 defines the interaction of the backend system with the workspace component 130 (i.e., how the workspace component accesses the backend 150). For example, if the workspace component 130 defines an interactive portal view of a tool provided by the backend 150, all accesses of the tool and responses to those accesses would flow to the backend 150.

Figure 2:
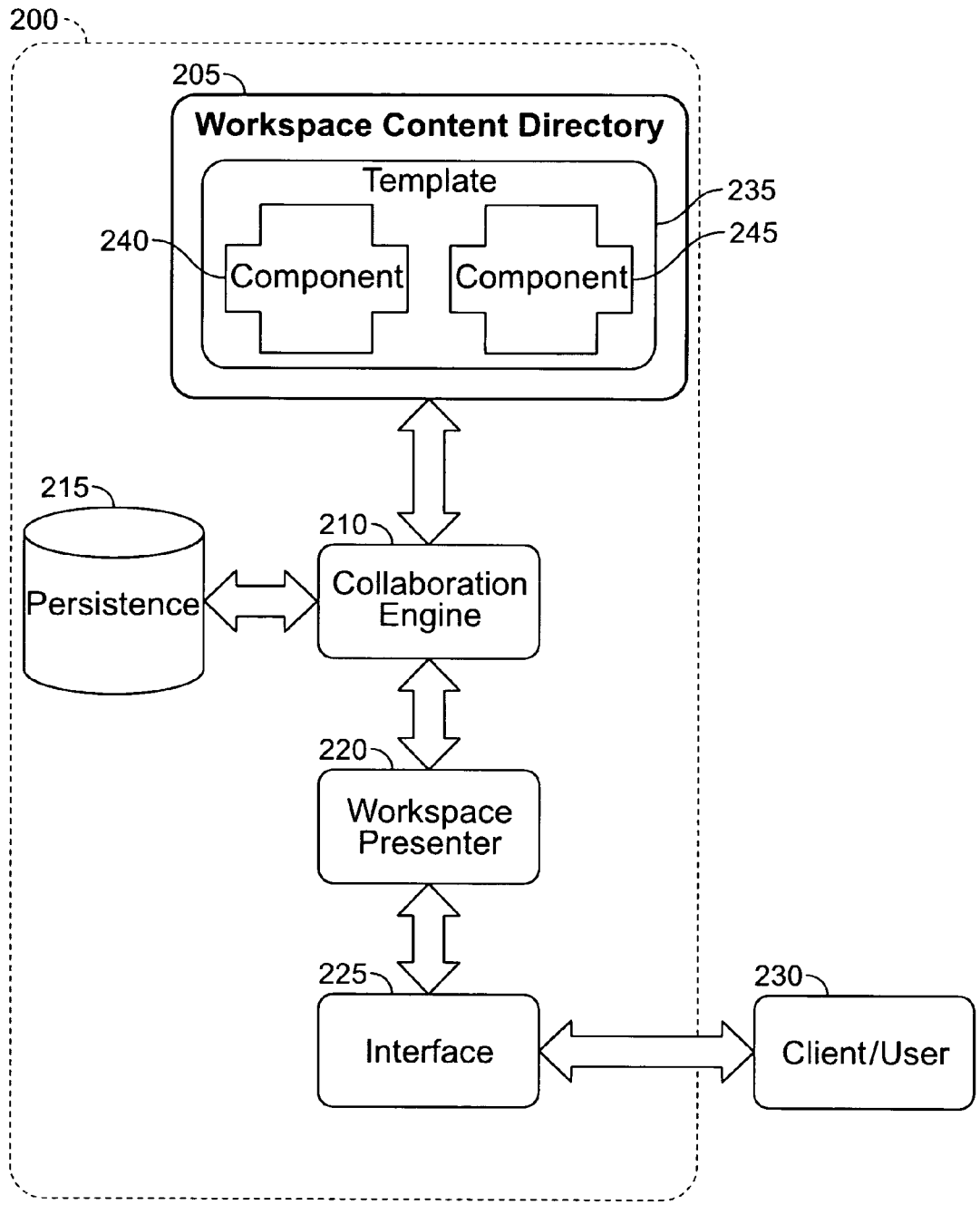
FIG. 2 illustrates a collaboration workspace system.

FIG. 2 is a schematic diagram of a system 200 for forming a collaboration workspace based on requests from a client/user 230. The client/user 230, also called simple "user," represents any client computer or terminal capable of accessing the system 200. A collaboration workspace for the user 230 is formed from a workspace template 235 and any number of workspace components 240, 245 that are stored in a workspace content directory 205. Once the collaboration workspace is formed, such as shown in the example in FIG. 1, it is presented to a user 230 via interface 225.

The template 235 provides a default combination of collaboration workspace content, such as tools, documents, and/or portal views, from which the collaboration workspace can be formed. The workspace content directory 205 may store any number of templates 235 from which the user 230 may choose a template that defines a desired combination of content.

Workspace components define modifications to a collaboration workspace. The types of modifications may include adding, removing, or changing workspace content. Depending on the workspace component, a workspace component may be used for any collaboration workspace or may be used for only a specific type of collaboration workspace. Templates and/or workspace components may define workspace content by defining a layout of workspace content (e.g., tools or resources) and defining that workspace content. Alternatively, a template need not be used to form a collaboration workspace and a collaboration workspace may be formed from workspace components. While FIG. 2 depicts the components 240 and 245 as part of the template 235, the components need not necessarily be part of the template 235. Also, the collaboration engine 210 may generate an instance of a collaboration workspace and later integrate the components 240 and 245 into the instance of the collaboration workspace.

The collaboration engine 210 retrieves content, such as the template 235, from the workspace content directory 205 to generate an instance of a collaboration workspace (i.e., form a collaboration workspace). Persistence area 215 provides a location where the collaboration engine 210 can store information related to a collaboration workspace. The persistence 215 may include any type of storage device or mechanism. The stored (i.e., persisted) information may include the content that makes up a collaboration workspace, information pertaining to the state of a collaboration workspace (e.g., parameters of a collaboration workspace, such as the name), parameters for integrating a collaboration workspace with workspace components, program resources such as documents used by a collaboration workspace, and/or relations among collaboration workspaces, as explained further below.

Workspace presenter 220 presents generated collaboration workspaces to the user interface 225. As part of presenting a generated collaboration workspace, the workspace presenter 220 presents an initial instance of a collaboration workspace and can later change its configuration based on user interaction. To provide an updated presentation of a collaboration workspace, the workspace presenter 220 may interact with the collaboration engine 210. The collaboration engine 210 and/or the workspace presenter 220 may also include access controls or other security mechanisms.

Figure 3:
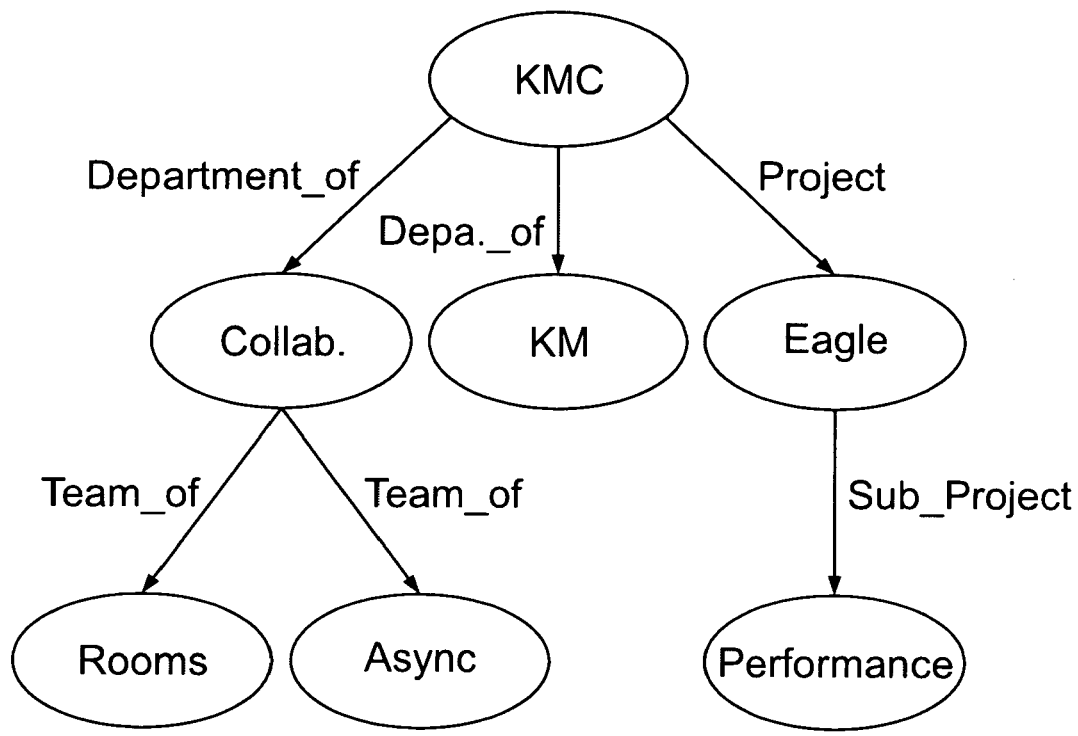
FIG. 3 illustrates workspaces linked by relations.

In most cases there is a semantic associated with a workspace, for example, a workspace represents a department. Therefore, a workspace may have a relation to other workspaces. For example, the teams within a single department can be represented by a relation. A complete relational structure can be represented graphically, as exemplified by the representation of an organizational structure 300 of a company shown in FIG. 3. Circles represent individual workspaces and lines linking two or more workspaces represent the relations between them.

Relations can be employed with collaborative workspaces to improve collaboration and communication. Other examples include: project/sub-project structures; links of interests; and hyperlink functionality for public workspaces. Each workspace can cover a topic with related information. Relations can be used as routers to route topics between related workspaces.

In one embodiment, a priority is defined for each relation. The priority can be used to define a position of information in a user interface, to structure a messaging queue of information from one workspace to other workspaces, or to execute other functions. Relations can be associated with a type to allow semantics to be used. Thus, several relation types can be used to connect workspaces. Later relation type information can be used for filtering and statistical processing. The relation types can either be configured centrally or defined on-the-fly by the creator of a relation. One program or application can create a relation, while the same or different program or application can define one or more types for the relation. Relations can also be created by end users or be configured by the system administrator. Accordingly, relation types are dynamic.

The following are examples of relation types. Other relation types can be used.

is_sub_organization_off
    is_sub_project_off
    is_interesting_also
    is_linked_to In some cases relations are global, such that each user can comprehend those relations from their respective workspace. Relations can be represented graphically or described in other ways in a workspace user interface. Global relations can be used to route users to other information locations. In other cases, the relations might only be visible to some people. Therefore, the system can restrict relations to be viewed and/or accessed only by a group of specified users. The ability to use relations can be based on a user's associated group or role. In one embodiment, a user is assigned to a group of users, or assigned a role within a group. In the case of a role, a group of users is defined in a business context (i.e. the role "HR Manager" contains all users in an organization that are responsible for HR). Thus, roles can be defined in the context of the workspace (i.e. the administrators of the specific workspace).

Restricted relations are also known as "secure" relations. Special cases of secure relations are: workspace-specific; application-specific; and personal. Workspace-specific relations can only be viewed and used by the members of a dedicated workspace. Application-specific relations can be created and controlled by another application and can be shown to all or a defined subset of users. Personal relations can only be used and viewed by one defined person. In a given system there can be different restricted relation types operating in parallel. For example, a workspace may include a presentation of a group's organizational structure, while also including a large group of personal relations. To generate a visualization of those parallel relations, security permissions are processed by the collaboration software.

A "room" is a collaborative workspace area to which two or more users can have access, such as by a relation. Room relations can be established by different user groups. For instance, a system administrator may establish a room relation centrally. Or, room administrators may establish a relation for a single room. Each user may also establish a personal relation to a room. The relation creator can be defined for the collaboration system. Also, specific user groups can be defined for creating specific kinds of relations. For example, the system may allow a normal user to create personal relations that are visible only to that user.

FIGS. 4A and 4B illustrate various interfaces of a room relations manager for two or more workspaces. FIG. 4A shows a first user interface 401 of a workspace in which all relations to other workspaces are shown. FIG. 4B shows a second user interface 402 in which a user can search for other workspaces and establish a relation to one or more of them. Relations can be established from a number of different origins. For instance, relations can be created inside of the current workspace to other workspaces, outside of a specific workspace with a central tool, and directly in or at the end of the creation process of a workspace that can be related to other workspaces. If an offspring workspace is created inside of the context of a parent workspace, the offspring workspace can automatically be linked by a relation to the parent workspace.

Using one or more APIs, relations between workspaces can be created automatically by any program or application. For example, an eLearning application that represents each course in a dedicated eLearning workspace can automatically route participants to related learning sessions (i.e. other workspaces) that are connected via relations. As a result, the relations of a system can be automatically managed and controlled. A given collaboration system can grant access permission only to such relations created by associated applications within the system.

Figure 5:
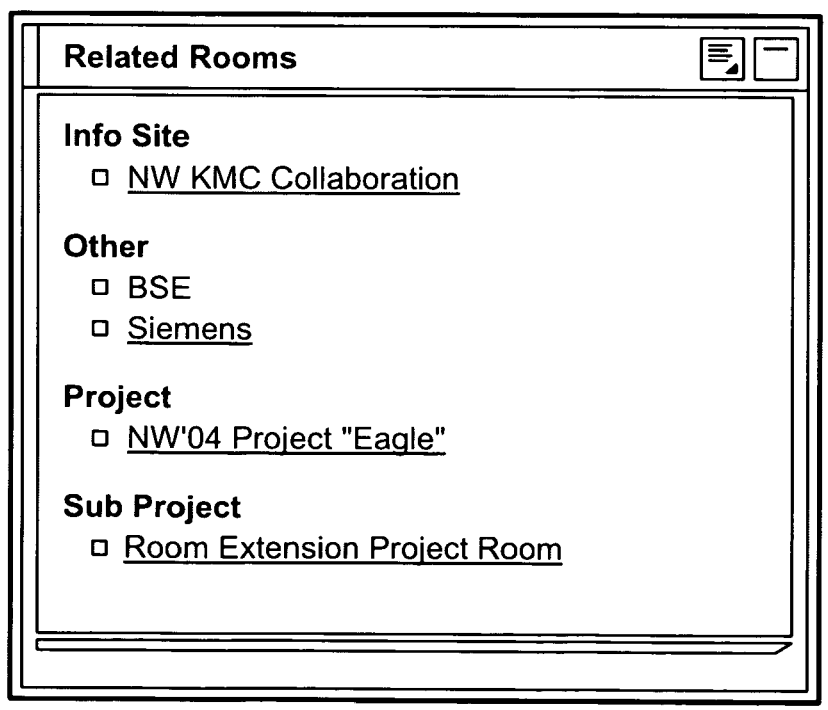
FIG. 5 illustrates a user interface.
Like reference symbols in the various drawings indicate like elements.

Relations can be visualized, i.e. rendered for display in a graphical user interface. A visualization includes at least the name of the relation. FIG. 5 shows an exemplary embodiment of a visualization. The visualization can be generated according to one of several different styles. One style includes a flat list inside of a current workspace. This style provides a flat list of relations from the current workspace to other workspaces. Another style includes a hierarchal view that can be used outside of a specific workspace, and thereby providing a general overview about all relations in the system, or inside of a workspace where the current workspace appears. Other styles can be used.

As described above, it may be necessary to restrict rights to view and/or modify relations. Therefore, depending on the creator of a relation, a user might be able to have individual access rights to 1) view, 2) use, and/or 3) modify. In most cases an administrator will be able to view, use and modify relations. Other users might be able view and/or use them (i.e. only members of the target workspace of a relation are allowed to use it). A creator of a relation may also be granted access to modify it.

As an example, in a system a user of one workspace creates a relation to another workspace. The user/creator can view, use and modify the relation. An administrator of an organization affiliated with the user/creator can also view, use and modify the relation. All the other members of the workspace can view the relation, and all the other members of the workspace which are also members in the target workspace can use the relation. Finally, remaining users in the system neither have access to view, use nor modify the relation.

Visualized relations can be used to directly transfer the user to a target workspace from a source workspace. As an example, a user sees a relation to another workspace, the user selects the relation, and is automatically transferred to the target workspace. Thus, relations are an efficient mechanism for navigating among related workspaces. In addition to navigation, a user may use a relation to directly access additional functionality on the target workspace. For example, a user can add a target workspace to his/her "favorites," request membership to it, or enter the related public information area. This can be visualized via a context menu or other graphical user interface mechanism.

Users can personalize a view of relations, preferably based on allowances by the workspace administrator. As an example, the user can remove a relation, change he priority of the relation or the position in the list, add their own relations, or add a "sticky" note (i.e. graphical window including information) to the relation. These changes may only be visible to that specific user, while nothing changes for all other users.

A number of user types for using relations can be defined. In an exemplary embodiment, at least three user types are defined: 1) administrator/content administrator (having access to all relations of the system for a good overview or to modify relations); 2) owners/creators of relations (who want to get an overview about their relations and also the relations from one specific workspace to another); and 3) user (who wants to use relations provided by other people). Accordingly, an ability to define which relations a user can modify or whether the user is even not allowed to modify a relation depends on the role and/or privileges of the user. Modifications to relations can be made to be automatically visible to all other users. The UI to modify relations can be the same or similar to the UI used to create them.

Relations between workspaces can establish and facilitate the automatic transfer of information. For example, via a relation, it is possible to define that all documents stored in a specific area of a workspace are to be copied into an area of one or more related workspaces. Rules can also be established for each relation. For example, rules can include: which kind of information should automatically be transported (i.e. all documents in a dedicated outbox area of a workspace); and a definition of one or more filters by which only parts of the information is transported (i.e. only documents for a specific topic). Rules can applied based on relation types (i.e. only other workspaces related via relation type "information_flow" might be filled with the information), and can define whether the information should be copied, moved or linked, and which area (i.e. an inbox area) the information should be transferred. The rules can be used to automatically spread information to other workspaces. In an example, a central documentation workspace creates FAQs and "help" documents, which are automatically spread into all workspaces linked by relations.

Relations can also be used for transferring selected characteristics from a parent workspace to offspring workspaces (or "sub-workspace"), as configured in the collaborative workspace system. Attributes of the parent workspace, such as users, user/role assignments, permissions, workspace content, or settings such as access modes for the workspace, can be inherited from the parent workspace. This configuration can either be done on a case-by-case basis, or in the template on which the workspace is based. Inheritance also can be used to automatically execute methods in one or more selected sub-workspaces which are done for the parent workspace. For instance, this can be used to automatically delete several workspaces.

Some use cases of inheritance include: members of the parent workspace are automatically members of the sub-workspace(s); or the permissions of the members in the parent workspace are automatically transferred into the sub workspace(s). Therefore an administrator of the parent workspace is automatically administrator in the sub workspace(s). Other use cases include: as soon as a workspace component is added to the parent workspace, it is automatically added to the sub-workspace; if the parent workspace is deleted all sub workspace(s) are automatically deleted; and if the parent workspace is archived or locked, all sub workspaces are also archived or locked.

Relations can be used for further analyses about the workspaces. The collaboration solution includes analytic functionalities to build reports based on this information. Analyses which can be done include: how often other links are relating to a specific workspace; a top list of most related workspaces can be created based on this information; and how often a specific relation type is used. Other analyses and reports are possible. When a workspace is deleted, all relations between it and other workspaces will automatically be deleted by the collaboration solution.

Relations can be used to automatically represent an organizational structure. For example, an organizational structure is stored inside of an HR system. A software component retrieves that structure and controls the collaboration solution via APIs to execute the following steps. For each department, (using APIs) a respective workspace is automatically generated and the members of the department are invited. Different kinds of workspace templates can be used depending on a number of factors such as the department level. Between organizationally related departments, a relation is created (using APIs). These relations can be based on a relation between a department and the sub departments, or between a department and projects running inside of it, etc. In this example, the relation type can be defined as "department-department" or "department-project," respectively.

Relations also can be used to check the content of a workspace using a search engine and/or one or more crawlers. Key words concerning the content for each workspace can be created. All workspaces containing the same key word will automatically be related using a specific relation type (i.e. "similar information"). Therefore, a workspace is linking to all other workspaces containing similar information.

Although a few embodiments have been described in detail above, other modifications are possible. Other embodiments may be within the scope of the following claims.

The invention claimed is:

1. A collaboration system, comprising:
one or more processors that implement functions comprising:
a first workspace having a first user interface and a second workspace having a second user interface, the first user interface providing information to one or more first users of the first workspace and the second interface providing information to one or more second users of the second workspace, the first and the second users being related within an organization structure;
a relation comprising a defined set of rules for routing information between the first and the second workspaces, the relation including a link between the first workspace and the second workspace that establishes and facilitates a collaborative pairing to enable navigation of the first and the second users between the first workspace and the second workspace; and
a key word relation that links the first workspace and the second workspace if the first workspace and the second workspace each contain a same key word as identified by a search engine and/or one or more crawlers.

2. The system in accordance with claim 1, wherein the relation is based on a semantic associated with the collaborative pairing of the first and the second workspaces.

3. The system in accordance with claim 1, wherein the relation is graphically represented in the first user interface and/or the second user interface.

4. The system in accordance with claim 1, wherein the relation is defined according to one of a number of relation types.

5. The system in accordance with claim 1, further comprising a workspace content directory having one or more templates, each template defining a workspace type.

6. The system in accordance with claim 5, wherein the workspace content directory includes a plurality of workspace components.

7. The system in accordance with claim 1, further comprising a security mechanism applied to the relation that controls whether a specific user of the first and the second users can modify the relation.

8. A method of linking information in a collaborative system, comprising:
providing, by one or more processors, a first workspace having a first user interface that provides a first subset of the linking information to one or more first users of the first workspace and a second workspace having a second user interface that provides a second subset of the linking information to one or more second users, the first and the second users being related within an organization structure; and
defining, by the one or more processors, a relation comprising a defined set of rules for routing information between the first and the second workspaces, and a key word relation that links the first workspace and the second workspace if the first workspace and the second workspace each contain a same key word as identified by a search engine and/or one or more crawlers, the relation including a link between the first workspace and the second workspace that establishes and facilitates a collaborative pairing that enables navigation of the first and the second users between the first workspace and the second workspace.

9. The method in accordance with claim 8, wherein the relation includes one or more filters according to which information is to be transported between the first workspace and the second workspace.

10. The method in accordance with claim 8, wherein the relation is defined based on a workspace type applied to the first and the second workspaces.

11. The method in accordance with claim 8, wherein the link includes one or more rules that define how information is to be transported between the first workspace and the second workspace.

12. The method in accordance with claim 8, further comprising defining a workspace type for each of the first and the second workspaces.

13. The method in accordance with claim 12, wherein the relation is defined based on the workspace type of each of the first and the second workspaces.

14. The method in accordance with claim 12, further comprising defining a set of users that can access each workspace based on the workspace type.

15. The method in accordance with claim 12, wherein a subset of users of the set of users can be selected for having access to the relation.

16. The method in accordance with claim 12, further comprising:

receiving an input from a user selecting the relation from the first workspace; and accessing the second workspace via the relation.

17. The method in accordance with claim 16, further comprising generating for the user a list of all other relations linked to the first workspace.

18. The method in accordance with claim 16, further comprising generating for the user a list of all other workspaces that are linked to the first workspace via relations.

19. A collaboration system for an organization having a number of users, the system comprising:

one or more processors a database storing information about the organization;

a plurality of workspaces provided for the users, wherein each user can access at least one workspace, and wherein each workspace includes a user interface for providing a subset of the information to at least one of the users; and a plurality of relations defined between pairs of workspaces, each relation comprising a defined set of rules for routing information between two or more paired workspaces of the plurality of workspaces, each relation including a link that establishes and facilitates a collaborative pairing between the two or more paired workspaces, the collaborative pairing to enabling navigation of one or more of the number of users from one workspace to another workspace in each paired workspaces, the plurality of relations comprising a key word relation that links a subset of the plurality of workspaces that each contain a same key word as identified by a search engine and/or one or more crawlers.

20. The system m accordance with claim 19, wherein at least one relation is configured to automatically transfer documents between the two or more paired workspaces according to routing rules defined for the relation.

* * * * *

UNITED STATES PATENT AND TRADEMARK OFFICE
CERTIFICATE OF CORRECTION

PATENT NO. : 7,634,539 B2  Page 1 of 1
APPLICATION NO. : 10/990932
DATED : December 15, 2009
INVENTOR(S) : Schwarz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1012 days.

Signed and Sealed this

Ninth Day of November, 2010

David J. Kappos
*Director of the United States Patent and Trademark Office*